United States Patent [19]

Spencer et al.

[11] Patent Number: 4,802,210
[45] Date of Patent: Jan. 31, 1989

[54] KEYBOARD SECURITY DEVICE

[75] Inventors: Joseph P. Spencer, Raheen Heights; Brendan F. Farrell, Killiney, both of Ireland

[73] Assignee: Institute for Industrial Research and Standards, Dublin, Ireland

[21] Appl. No.: 64,474

[22] Filed: Jun. 22, 1987

[30] Foreign Application Priority Data

Jun. 23, 1986 [IE] Ireland ............... 1662/86

[51] Int. Cl.⁴ ............................................. H04M 1/66
[52] U.S. Cl. ...................................... 379/445; 292/87; 70/134
[58] Field of Search ............... 70/134, DIG. 72; 292/80, 85, 86, 87, DIG. 38; 379/200, 199, 445, 368

[56] References Cited

U.S. PATENT DOCUMENTS 4,280,025  7/1981  Carlberg ................. 379/455
4,662,664  5/1987  Wendt et al. ............. 292/87

FOREIGN PATENT DOCUMENTS 3205626  8/1983  Fed. Rep. of Germany ...... 379/445

Primary Examiner—James L. Dwyer
Attorney, Agent, or Firm—Sughrue, Mion, Zinn, Macpeak and Seas

[57] ABSTRACT

The invention provides a keyboard security device for preventing access to a keyboard, such as the digit keys of the keyboard of a digital telephone. The device comprises a base framework with a releasable and removable cover. An engagement member engages a recess in a side member of the framework. Locking means provided by resilient members on the cover engage openings in an inner wall of the framework. A key with spuds corresponding to the resilient members is pivotal in a key accommodating slot to engage the resilient members and disengage them from the openings.

20 Claims, 4 Drawing Sheets

KEYBOARD SECURITY DEVICE

FIELD OF THE INVENTION

The present invention relates to a security device for preventing access to at least some of the keys of a keyboard, and in particular though not limited to a security device for preventing access to at least some of the keys of the keyboard of a digital telephone.

BACKGROUND TO THE INVENTION

With the present relatively high cost of telephone calls, it is important that the unauthorised use of a telephone is prevented. A particular problem arises where babysitters, children or the like are left for long periods of time in a house on their own. Without the knowledge of the house owner, they can make unlimited numbers of telephone calls to unlimited destinations. It is impossible to positively determine whether a particular individual or not made the calls. Furthermore, there are many cases where it is necessary to prevent access to at least some, if not all, of the keys of a keyboard of, for example, a computer, a cash register, a typewriter or the like. There is therefore a need for a security device which can readily easily be fitted to a telephone to prevent access to at least some of the digit keys of a digital telephone which overcomes the problems and disadvantages of known devices. Indeed, there is also a need for such a security device which may be fitted to any keyboard, for example, a computer keyboard or the like, similarly to prevent access to at least some of the keys.

Attempts have been made to provide security devices for telephones. However, these devices have not been entirely successful. In general, such devices comprise a base framework which is secured to the housing of the telephone and a cover which is usually pivotally or releasably connected to the framework. The cover extends over the keypad of the telephone to prevent access to the digit keys. A padlock or barrel lock is usually provided for locking the cover to the base framework. Two such devices are disclosed in U.S. Pat. Nos. 3,866,000 and 3,965,310. These devices suffer from a number of disadvantages. In particular, because of the type of locking arrangements used, they, in general, tend to be cumbersome and also relatively expensive. A disadvantage of devices which require a padlock to secure the cover to the base framework is that because of the construction of these devices, the portion of the framework which engages the cover, or vice versa, can very easily break off and render the device thus useless. A further problem with padlock devices is that the padlock can be easily mislaid, or the keys of the padlock can similarly be easily mislaid.

OBJECTS OF THE INVENTION

One object of the invention is to provide a security device for a keyboard to prevent access to some or all of the keys, such as, for example, the keyboards of a telephone, typewriter, cash register or the like. It is also an object of the invention to provide a security device for a keyboard which is relatively neat and compact. It is a further object of the invention to provide a security device which is relatively secure. Another object of the invention is to provide a security device for a keyboard which is relatively inexpensive and can readily easily be manufactured, and also can be readily easily mounted to the keyboard.

SUMMARY OF THE INVENTION

According to the invention, there is provided a keyboard security device for preventing access to at least some of the keys of a keyboard, the device comprising a base framework for mounting on a housing of the keyboard, the base framework comprising a pair of spaced apart side members which between them form an opening for the keys of the keyboard, a cover extending across the base framework from one side member to the other to prevent access to at least some of the keys, and locking means to lock the cover to the base framework, the locking means comprising a receiving means on a side member of the base framework or on the cover, and at least one resilient member extending from the cover or the base framework releasably engagable with the receiving means to secure the cover to the base framework, the resilient member being engagable by a key means for disengagement from the receiving means.

In one embodiment of the invention, each resilient member extends from the cover, and the receiving means is formed by a receiving opening through the side member, and each resilient member is engaged through the receiving opening by the key means. Preferably, each resiient member comprises a resilient carrier member extending from the cover and a lug on the end of the carrier member engagable with the receiving opening.

Advantageously, the side member accommodating the receiving opening comprises an inner side wall and an outer side wall, the inner and outer side walls being spaced apart to define between them an elongated key accommodating slot for the key means, the receiving opening being provided in the inner side wall and communicating with the key accommodating slot.

In another embodiment of the invention, the ends of the key accommodating slot are closed by a pair of end walls extending between the inner and outer side walls. Preferably, pivot means are provided on the end walls for pivotally supporting the key means for engagement with each resilient member. Advantageously, the pivot means is provided by a recess in each end wall for releasably engaging a corresponding pivot shaft on the key means.

Preferably, key means are provided for engagement with each resilient member. Advantageously, the key means comprises an elongated key member engagable in the key accommodating slot, the key member comprising one spud extending therefrom for each resilient member, and each spud being engagable with its corresponding resilient member for disengaging the resilient member from the receiving opening.

In one embodiment of the invention, a plurality of resilient members are provided, and a plurality of receiving openings are provided, at least one receiving opening for each resilient member.

In another embodiment of the invention, an engagement member extends from the cover on the side opposite the locking means, the engagement member being releasably engagable with a recess in the adjacent side member.

Advantageously, a pair of spaced apart cross members extend between the side members at either end thereof to form with the side members the opening for the keys of the keyboard.

Preferably, the cover extends between the side members and the end members.

In one embodiment of the invention, the base framework is adapted for mounting on a telephone housing.

ADVANTAGES OF THE INVENTION

The advantages of the invention are many, however, one particular advantage of the invention is that a relatively neat and compact security device is provided, which at the same time is relatively secure. A further advantage of the invention is that the security device can be produced readily easily, and at relatively low cost, while at the same time being a relatively secure device.

These advantages are achieved by virtue of the fact that the locking means is incorporated in the cover and framework without the need for additional apparatus or devices to be assembled to the cover and the framework. Where the locking means are provided by resilient members which are integrally injection moulded with the cover and receiving means are provided by openings in the base framework, no additional locking arrangements are required. Furthermore, a further advantage of the invention is that many different numbers and arrangements of positions of resilient members can be provided, thereby providing many different combinations of locking means for other security devices.

A further advantage of the invention is achieved when the key accommodating slot is provided. In this case, a particularly secure device is provided in that the key accommodating slot virtually totally prevents access to the resilient members without the key.

The invention will be more clearly understood from the following description of a preferred embodiment thereof, given by way of example only, with reference to the accompanying drawings.

BRIEF DESCRIPTION OF THE DRAWINGS

FIG. 7 is a perspective view of another portion of the device of FIG. 1, FIGS. 8(a) to (c) are sectional views of a detail of the security device of FIG. 1 in operation, FIG. 9 is a sectional view of another detail of the security device of FIG. 1.

DETAILED DESCRIPTION OF THE INVENTION

Figure 1:
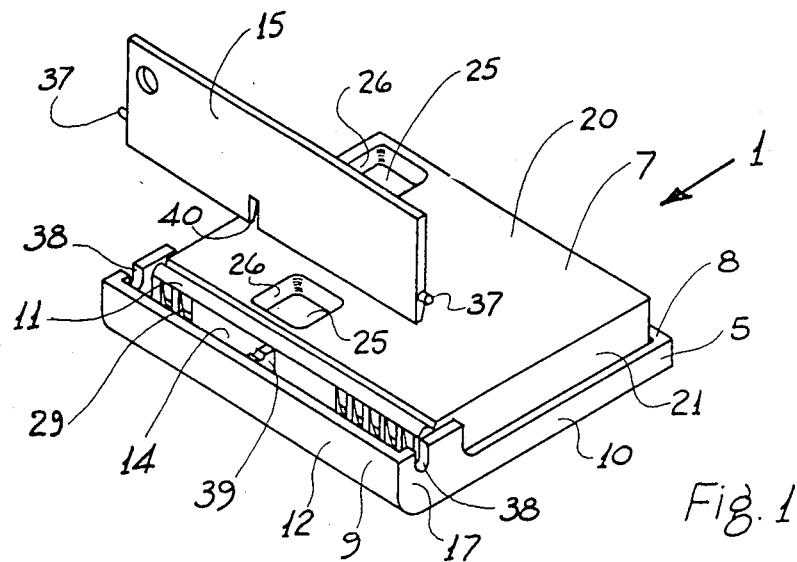
FIG. 1 is a perspective view of a security device according to the invention.
Figure 2:
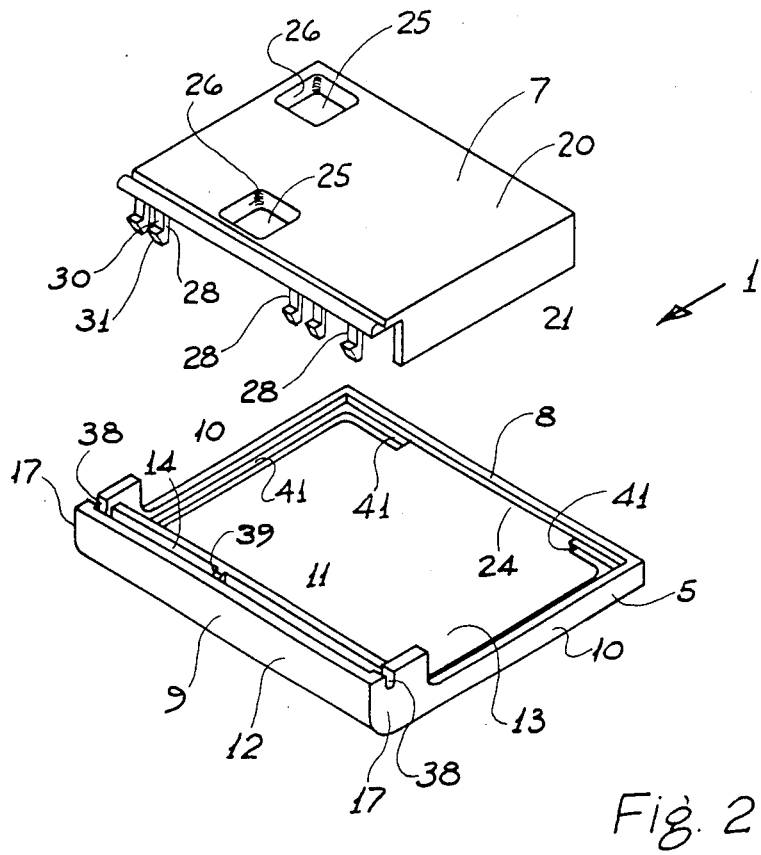
FIG. 2 is an exploded perspective view of the security device of FIG. 1.
Figure 3:
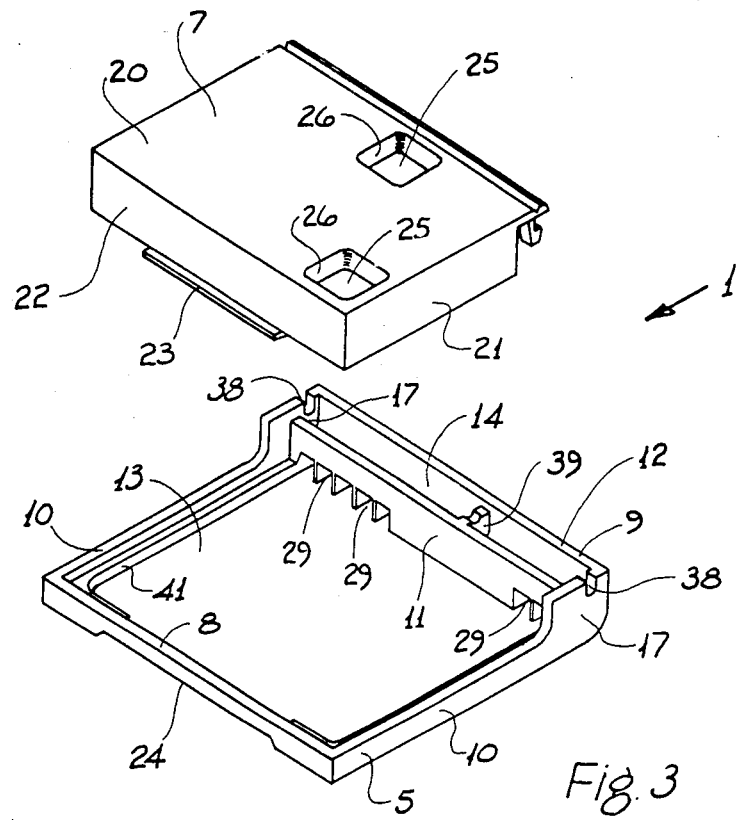
FIG. 3 is an exploded perspective view of the security device of FIG. 1 from a different direction.
Figure 4:
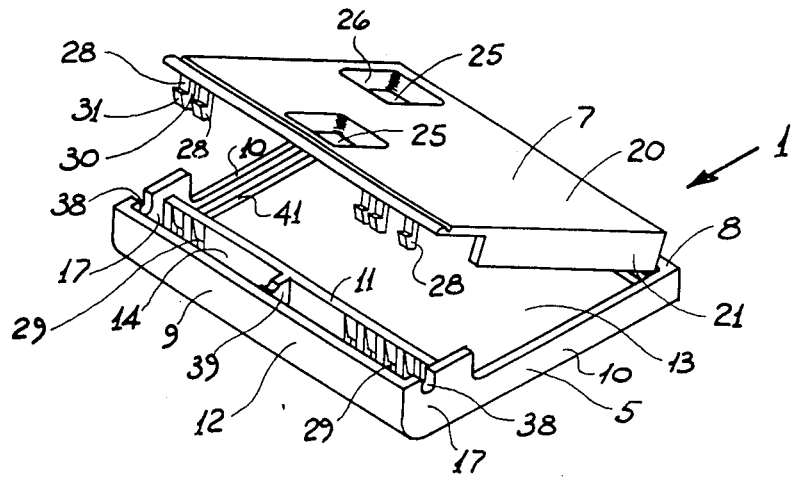
FIG. 4 is a perspective view of the security device of FIG. 1 in a different position.
Figure 5:
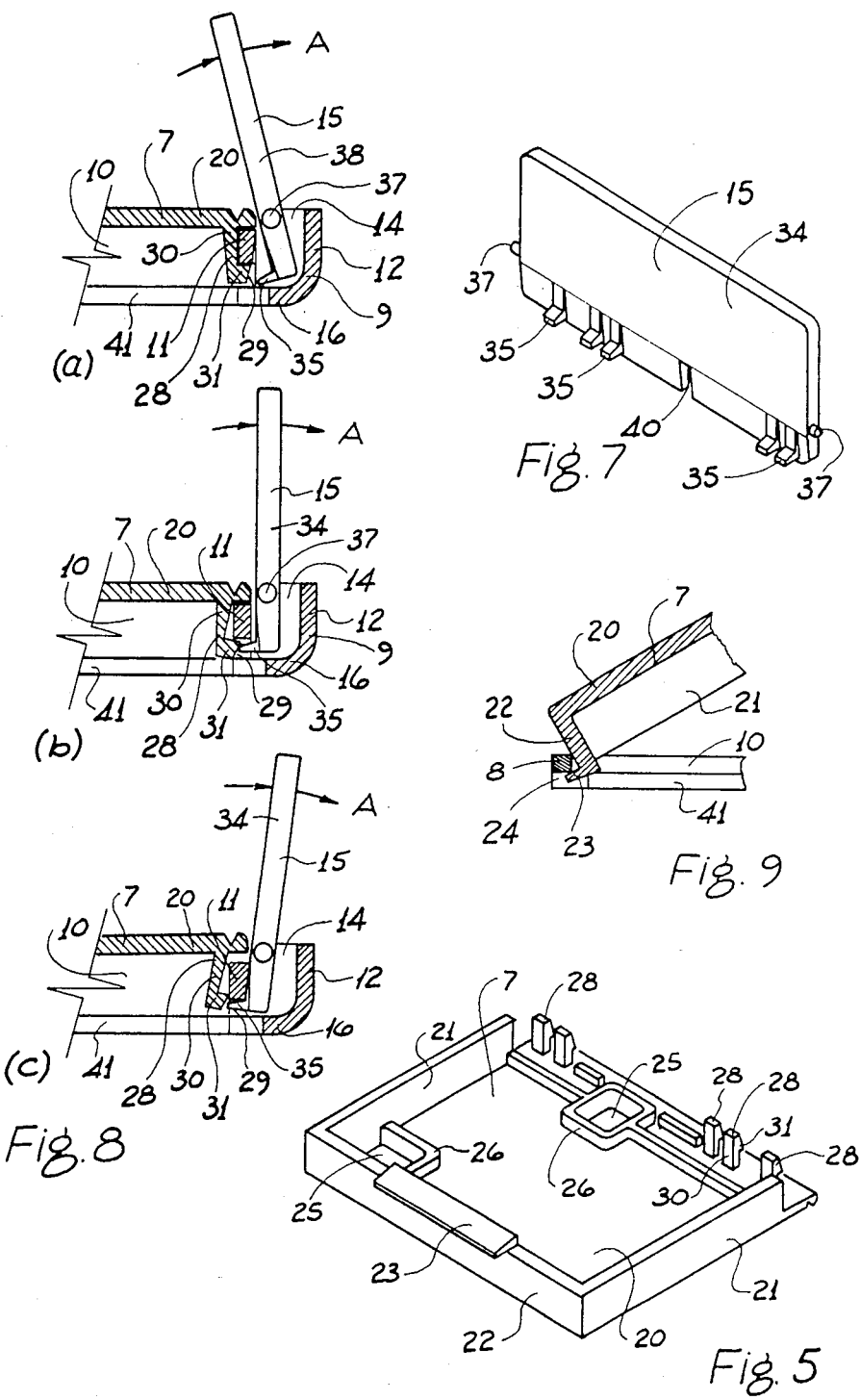
FIG. 5 is an underneath perspective view of portion of the security device of FIG. 1.
Figure 6:
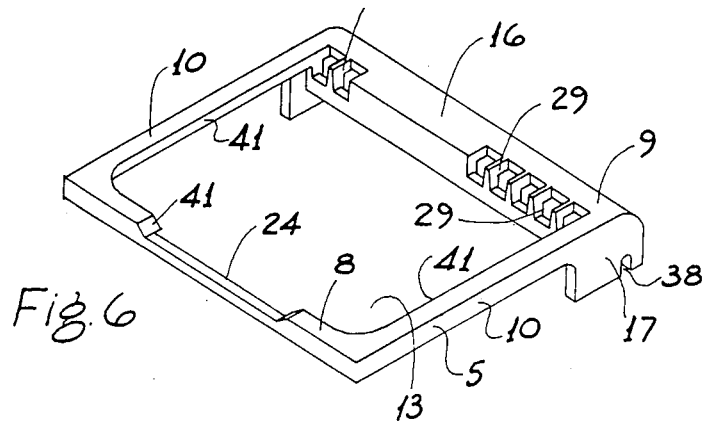
FIG. 6 is an underneath perspective view of portion of the security device of FIG. 1.
Figure 10:
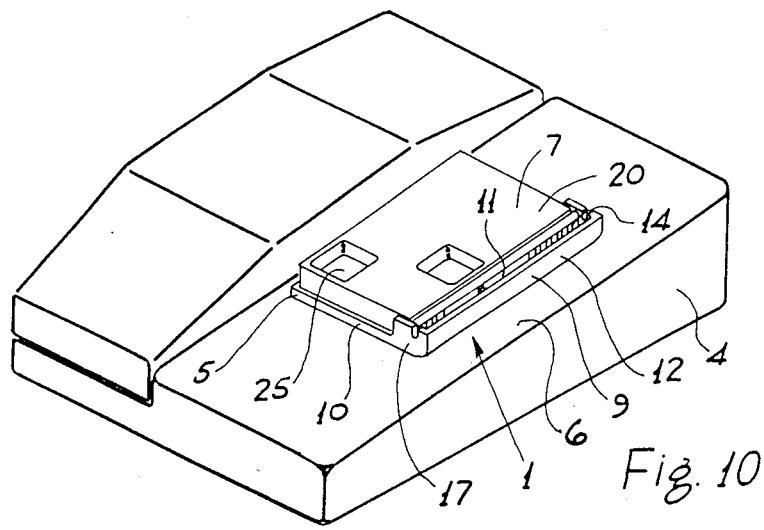
FIG. 10 is a perspective view of the security device illustrated mounted on a telephone.
Figure 11:
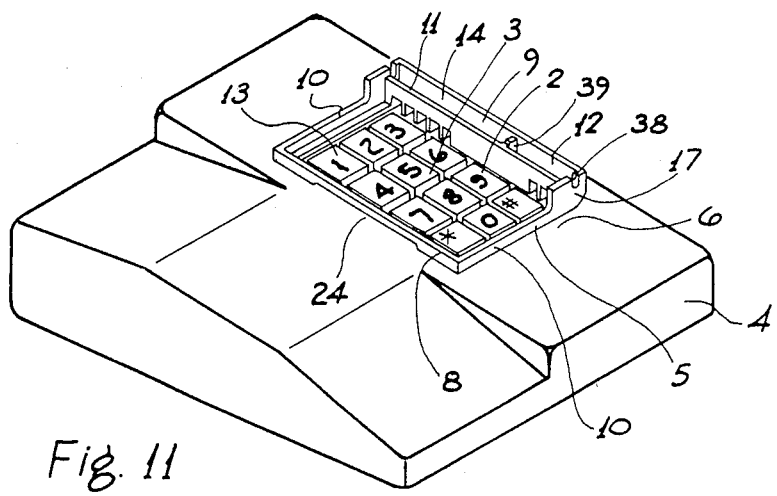
FIG. 11 is a perspective view of portion of the security device illustrated mounted on the telephone.

Referring to the drawings, there is provided a security device according to the invention indicated generally by the reference numeral 1 for preventing access to the digit keys 2 of the keyboard 3 of a digital telephone 4. The device 1 comprises a base framework 5 which in use is secured to a housing 6 of the telephone 4 by an adhesive, as will be described below. A cover 7 which extends across the keyboard 3 to prevent access to some of the keys 2 is releasably engagable with and removable from the base framework 5.

The base framework 5 is of injection moulded plastics material and comprises a pair of side members 8 and 9 joined by cross members 10, which form an opening 13 to the keyboard 3. The side member 9 is formed by an inner wall 11 and an outer wall 12 which between them define a key accommodating slot 14 to accommodate a key means, namely a key 15 for releasing the cover 7 from the framework 5 as will be described below. A base member 16 extends between the inner and outer walls 11 and 12 to close the base of the slot 14 and the ends of the slot 14 are closed by end walls 17 which are formed by extensions of the cross members 10.

The cover 7 is of injection moulded plastics material and comprises a main plate 20 with downwardly extending end members 21 joined by a side member 22. An engagement member 23 extending from the side member 22 releasably engages a recess 24 in the side member 8. As can be seen in FIG. 9 the engagement member 23 is tapered outwardly to facilitate pivoting of the cover member 7 during securing of the cover member 7 to the framework 5 and also during removal of the cover member 7 from the framework 5. Two openings 25 are provided in the cover 7 to permit access to the nine digit key and the memory key of the keyboard. Side walls 26 extend downwardly from the plate 20 around the openings 25 to prevent access to any of the adjacent keys.

Locking means to lock the cover 7 to the framework 5 is provided by a plurality of resilient members 28 which extend downwardly from the plate 20 of the cover 7, and engage corresponding receiving means, namely receiving openings 29 in the inner wall 11 of the side member 9. Each resilient member comprises a resilient carrier member 30 which carries a lug 31 at its free end. The lugs 31 engage the receiving openings 29. As can be seen in FIG. 8(a), in this particular embodiment of the invention there are seven openings 29, while there are only five resilient members. Accordingly, other security devices also according to the invention can be provided with different numbers and arrangements of resilient members 28. This thus permits a large number of lock combination to be provided for different security devices. The resilient members 28 are integrally injection moulded with the cover 7 and are shaped and sized relative to the framework 5 so that the lugs 31 snap into engagement with the openings 25, see FIG. 8.

The key 15 comprises an elongated plate member 34 with a plurality of spuds 35 in this case five spuds, each spud 35 corresponding to a resilient member 28. Pivot means to permit pivoting of the key 15 in the key accommodating slot 14 is provided by a pair of pivot shafts 37 extending at each end of the plate member 34 which engage corresponding pivot means, namely pivot recesses 38 in the end walls 17 of the key accommodating slot 14. Thus to disengage the resilient members 28 from the receiving openings 29, the key 15 is inserted in the key accommodating slot 14 as illustrated in FIGS. 8(a) to (c) so that the pivot shafts 37 pivot in the recesses 38. The key 15 is pivoted in the direction of the arrow A, causing the spuds 35 to engage the lugs 31 through the receiving openings 29, and on further pivoting of the key 15 in the direction of the arrow A, the resilient members 28 are bent inwardly, thereby releasing the lugs 31 from the receiving openings 29. This permits the cover 7 to be removed from the framework 5.

A re-inforcing wall 39 is provided in the key accommodating slot 14 between the inner and outer walls 11 and 12. A recess 40 in the plate 34 of the key 15 allows for clearance of the re-inforcing wall 39. It is envisaged that other security devices will be provided with the re-inforcing wall 39 in a different position. This will require a key 15 with a recess 40 in a correspondingly different position. Accordingly, by varying the position of the re-inforcing wall 39 in the slot 14, the number of lock combinations can be further increased. In fact, in certain cases, more than one re-inforcing wall 39 may be provided, still further increasing the number of lock combinations.

Inwardly directed lips 41 from the side member 8 and cross members 10 are provided to abut the end members 21 and side members 22 of the cover 7.

In use, the base framework 5 is secured to the housing 6 of the telephone 4 adjacent the keyboard 3, so that the keys 2 of the keyboard 3 project through the opening 13 in the framework 5. Any adhesive suitable for bonding plastic to plastic may be used. To engage the cover 7 in the framework 5, the cover 7 is angled and the engagement member 23 is engaged beneath the side member 8 in the recess 24. The cover 7 is then pivoted downwardly, thus causing the lugs 31 of the members 28 to snap into the receiving openings 29. Accordingly, the cover 7 is locked in position on the framework 5. In this position, access is only provided through the openings 25 to the nine digit key and the memory digit key. Thus, with the cover 7 locked on the framework 5 emergency calls may be made, and any call or calls which have been stored in the memory of the telephone, should the telephone have a memory facility.

To release the cover 7 from the framework 5, the key 15 is inserted in the key accommodating slot 14 as already described, and pivoted in the direction of the arrow A, thus releasing the lugs 31 from the receiving openings 29. The cover 7 can then be removed from the framework 5.

By virtue of the fact that less resilient members 28 than receiving openings 29 are provided, a large number of combinations of arrangements and numbers of resilient members can be provided than on other security devices. Thus, keys with different arrangements and numbers of spuds 35 will be provided to open covers with different arrangements of resilient members. This, accordingly, further adds to the security of the device, in that different keys with different arrangements of spuds will be required to open security devices with different arrangements of resilient members. Indeed, it is not necessary that five resilient members should be provided, in certain cases, fewer resilient member may be provided if desired. Furthermore, as discussed above, by varying the position and number of re-inforcing walls 39 in the key slot 14 in other security devices, a greater number of lock combinations can be provided.

The invention has many advantages over security devices known heretofore, and in particular, one important advantage is achieved by virtue of the locking means used. Because of the locking means used in the security device according to the invention, a relatively inexpensive device can be provided, while at the same time, the device is relatively secure. Furthermore, by virtue of the locking means used, the device is particularly neat and compact in size, and is not cumbersome.

Furthermore, since the locking arrangement is incorporated within the cover and the framework there is no danger of it being lost.

It is envisaged that in certain cases the base member 16 of the key accommodating slot 14 may be dispensed with, however, where the base member is dispensed with, it is envisaged that a portion of weakness may be incorporated in the inner wall 11. This would cause the inner wall 11 to snap off at the weakened portion should an attempt be made to force the cover from the framework. Thus, the security device would immediately indicate that it had been tampered with.

It is also envisaged in certain cases that the base framework may be provided with a self-adhesive coating so that the framework could be secured to the telephone housing without the need of a separate adhesive. Alternatively, it is envisaged that a double sided adhesive tape may be used to secure the framework to the telephone housing. Needless to say, any other suitable fixing means, for example, screws, rivets or the like could also be used. It is also envisaged that brackets may be provided to secure the framework to the telephone housing.

Needless to say, while the framework and cover have been described as being of injection moulded plastics material, they could be formed by any other suitable construction, and could be formed from any other suitable material.

While a particular construction of cover and base framework have been described, other suitable constructions could be used without departing from the scope of the invention. For example, it is envisaged in certain cases that the cover could be provided without the openings to provide access to certain digit keys. In fact, in certain cases, no access to any of the keys may be provided, and in an alternative case, access to the emergency key only may be provided. Needless to say, more or less openings as desired could be provided.

It is also envisaged that instead of the cover being detachably mounted to the framework, it could be pivotally mounted. In which case, the cover would be pivotal on the side member 8 of the base framework.

It is also envisaged that a side member 9 other than the construction described could be provided without departing from the scope of the invention. For example, in certain cases, it is envisaged that the outer wall 12 may be dispensed with. It will also, of course, be appreciated that while it is advantageous to provide end walls to the key accommodating slot, these could similarly be dispensed with. It is also envisaged that where end walls 17 are provided, the pivot recesses may be dispensed with, or alternatively pivot pins may be provided to engage corresponding recesses in the key member. If desired, the re-inforcing member 39 may be dispensed with. Needless to say, other suitable arrangements and constructions of key may be provided without departing from the scope of the invention. For example, it will be readily appreciated that it is not necessary for the key to be in the form of a plate member. Further, other suitable arrangements and construction of resilient members and lugs could be used, as indeed could different arrangements of receiving means besides the openings in the inner wall 11 be used. In certain cases, one opening may be provided to engage all the resilient members. Furthermore, different arrangements of spuds or different constructions of spuds on the key could be used without departing from the scope of the invention.

Furthermore, it is envisaged that in certain cases the resilient members may be provided on the framework and the openings on the cover member.

While the side member 9 has been described as comprising a key accommodating slot, while this has the advantage of providing a relatively simple straightforward locking arrangement which is not easily tampered with, and yet relatively inexpensive, nonetheless, in certain cases it is envisaged that the key accommodating slot could be modified or changed in shape or construction or in certain cases may be dispensed with altogether.

While the cover has been described as covering the entire keyboard, this is not necessary, the cover need only cover portion of the keyboard, and furthermore, while the framework has been described as comprising side and end members, it will readily be appreciated that the end members could be dispensed with altogether. In which case, two side members only would be required, and these would be secured on opposite sides of the keyboard.

It is also envisaged that the recess in the side member 8 may not extend to the outer face of the side member. In fact, this would have the advantage that it would ensure that an attempt could not be made to disengage the cover by disengaging the engagement member from the recess.

Furthermore, while the security device has been described for preventing to access to the keys of the keyboard of a digital telephone, it could be used for preventing access to the keys of any other type of keyboard, for example, a typewriter keyboard, a computer keyboard, a cash register keyboard, or the like. Needless to say, where the security device is provided to prevent access to the keys of other keyboards, the cover may be arranged to prevent access to all or some of the keys as desired.

Further, it is envisaged that in certain cases the resilient members may be provided by spring loaded members which would snap into the receiving means.

We claim:

1. A keyboard security device for preventing access to at least some of the keys (2) of a keyboard (3), the device comprising:
   a base frame member (5) for mounting on a housing (6) of the keyboard, the base frame member forming an access opening (13) to provide access to the keys of the keyboard,
   a cover member (7) closing at least a portion of the access opening in the frame member to prevent access to at least some of the keys, and
   locking means to lock the cover member to the base frame member, the locking means comprising:
   a receiving means (29) formed by a receiving opening in one of said frame member and said cover member, and
   at least one resilient member (28) extending from another of said frame member and said cover member and releasably engagable with the receiving opening to secure the cover member to the base frame member, the resilient member being engagable through the receiving opening by a key means (15) for disengagement of the resilient member from the receiving opening.

2. A security device as claimed in claim 1 in which each resilient member is provided on the cover member, and the receiving opening is formed in the base frame member.

3. A security device as claimed in claim 2 in which each resilient member comprises a resilient carrier member extending from the cover member, and a lug on the end of the carrier member engagable with the receiving opening.

4. A security device as claimed in claim 1 in which the frame member comprises a pair of spaced apart side members (8, 9) which form the access opening, the receiving opening being formed in one of the side members, and the side member in which the receiving opening is formed comprising an inner side wall and an outer side wall, the inner and outer side walls being spaced apart to define between them an elongated key accommodating slot for the key means, the receiving opening being provided in the inner side wall and communicating with the key accommodating slot.

5. A security device as claimed in claim 4 in which the receiving opening is provided in the side wall adjacent the bottom of the key accommodating slot.

6. A security device as claimed in claim 4 in which the ends of the key accommodating slot are closed by a pair of end walls extending between the inner and outer side walls.

7. A security device as claimed in claim 6 in which pivot means are provided on the end walls for pivotally supporting the key means for engagement with each resilient member.

8. A security device as claimed in claim 7 in which the pivot means is provided by a recess in each end wall for releasably engaging a corresponding pivot shaft on the key means.

9. A security device as claimed in claim 4 in which key means is provided for engagement with each resilient member.

10. A security device as claimed in claim 9 in which the key means comprises an elongated key member engagable in the key accommodating slot, the key member comprising one spud extending therefrom for each resilient member, and each spud being engagable with its corresponding resilient member for disengaging the resilient member from the receiving opening.

11. A security device as claimed in claim 10 in which pivot shafts extend from each end of the key member for releasably and pivotally engaging the base frame member.

12. A security device as claimed in claim 1 in which a plurality of resilient members are provided.

13. A security device as claimed in claim 12 in which a plurality of receiving openings are provided, at least one receiving opening for each resilient member.

14. A security device as claimed in claim 4 in which an engagement member (23) extends from the cover member on the side opposite the locking means, the engagement member being releasably engagable with a recess (24) in the adjacent side member.

15. A security device as claimed in claim 14 in which the engagement member extends sidewardly from a downwardly extending portion of the cover member.

16. A security device as claimed in claim 14 in which the recess is formed in the bottom of the side member.

17. A security device as claimed in claim 4 in which a pair of spaced apart cross members (10) extend between the side members at either end thereof to form with the side members the access opening for the keys of the keyboard.

18. A security device as claimed in claim 17 in which the cover member extends between the side members and the cross members.

19. A security device as claimed in claim 1 in which at least one key access opening is provided in the cover member to provide access to a key of the keyboard.

20. A security device as claimed in claim 1 in which the base frame member is adapted for mounting on a telephone housing.

* * * * *